Jan. 13, 1931.  J. B. REIGNERON  1,788,743
MOTOR VEHICLE
Original Filed Feb. 5, 1926   2 Sheets-Sheet 1
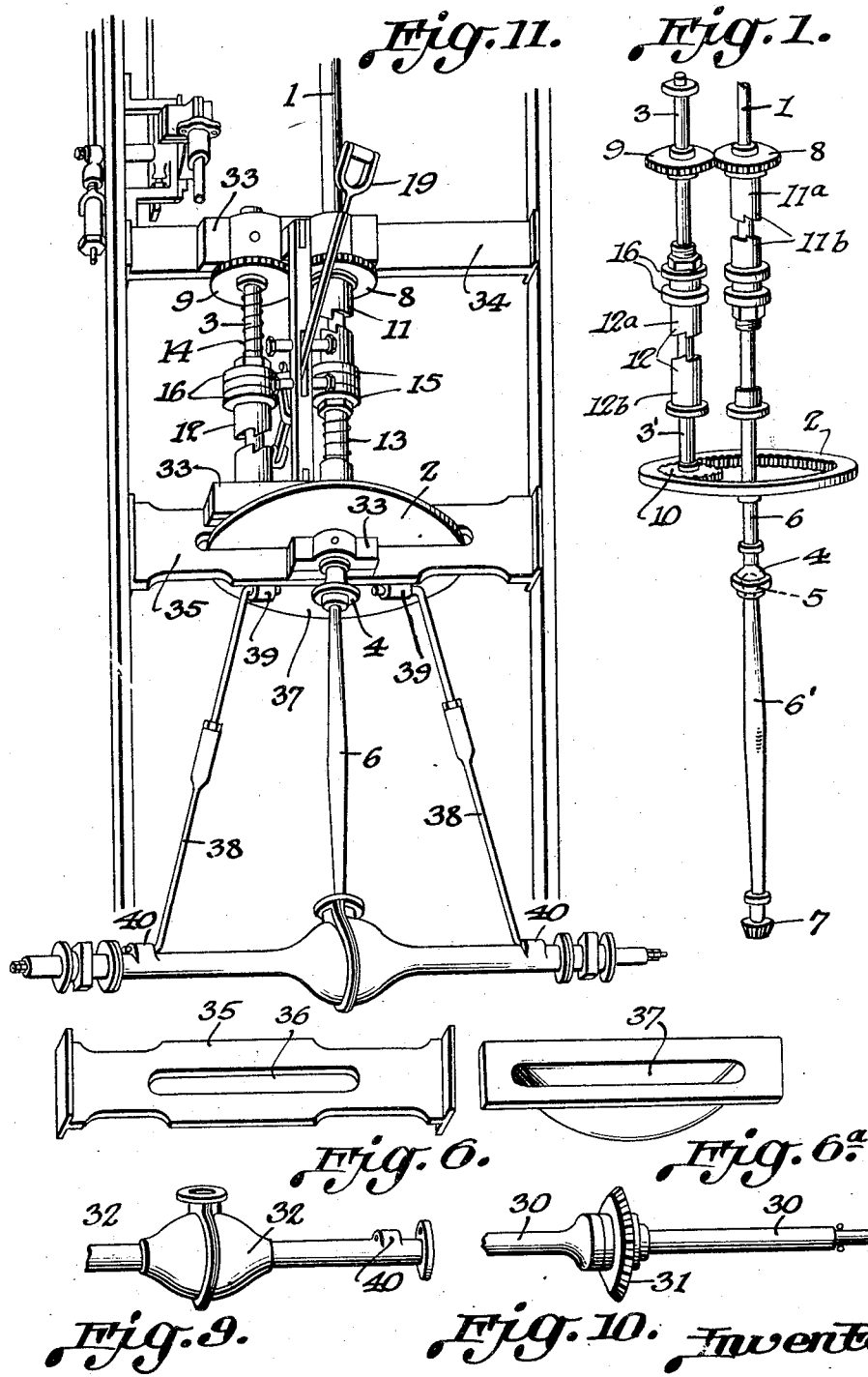

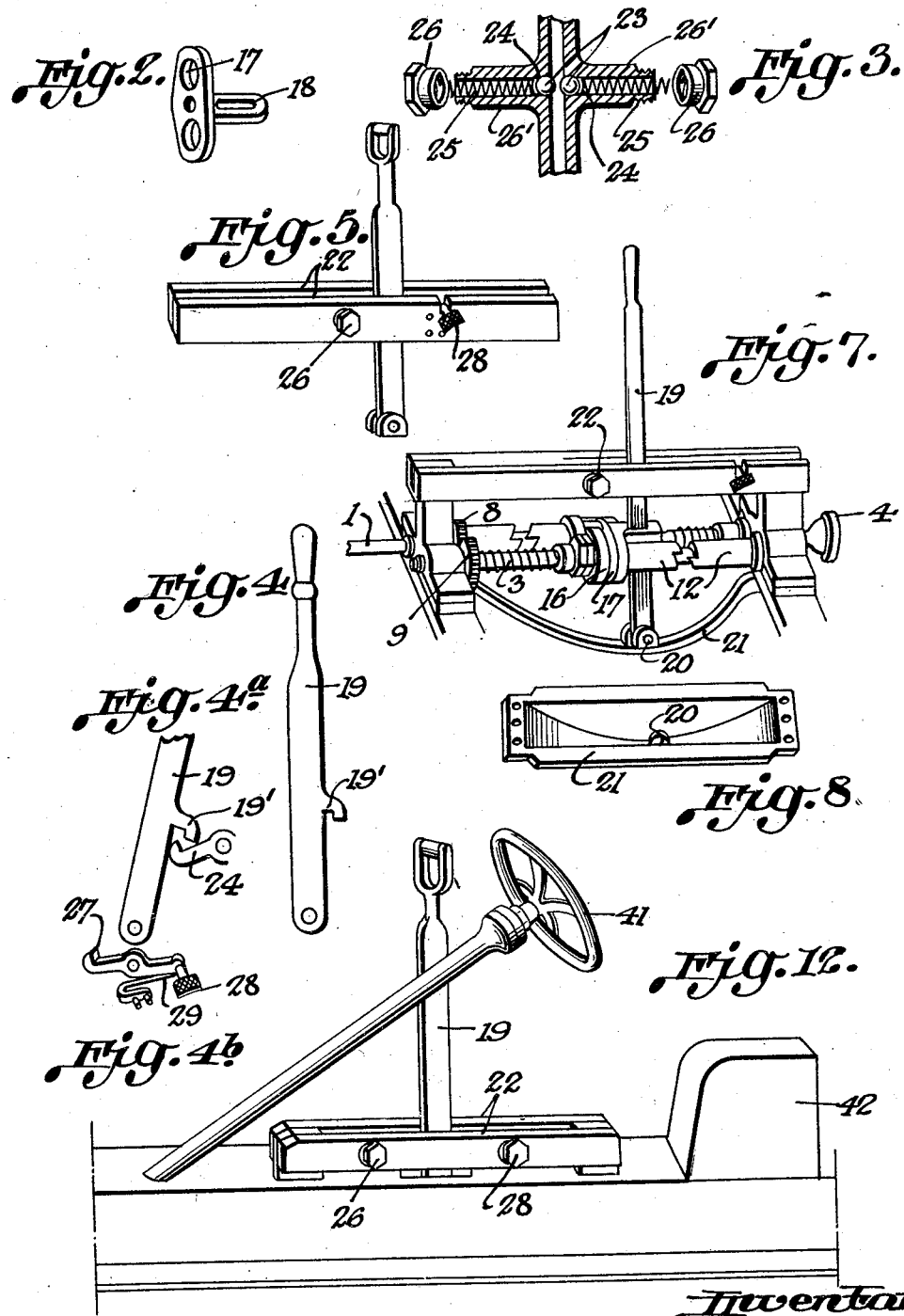

Patented Jan. 13, 1931

1,788,743

UNITED STATES PATENT OFFICE

JEAN BAPTISTE REIGNERON, OF TROUGET, FRANCE

MOTOR VEHICLE

Original application filed February 5, 1926, Serial No. 86,296, and in France January 9, 1926. Divided and this application filed December 16, 1926. Serial No. 155,272.

My invention relates to reversing means for motor vehicles in which changing rapidly and without shock from forward to reverse movement takes place of the type described and claimed in my copending application Serial No. 86,296, filed February 5, 1926, of which the present application forms a division.

This arrangement is characterized by the combination of the constitutive parts and by the method of control obtained by the use of a lever disposed close to the driver such lever being moreover capable of being secured in the position of reverse by actuating a pedal.

A constructional embodiment of the invention is shown in the accompanying drawings, in which:

Figure 1 is a detail of the reversing mechanism in perspective; Fig. 2 is a detail of a control plate in perspective; Fig. 3 is a sectional detail of the hand lever latch; Fig. 4 is an elevational view of the hand lever; Fig. 4a is a detail of the hand lever and locking pawl; Fig. 4b is a detail of the foot pedal and locking pawl. Fig. 5 is an assembly view of the hand lever and foot pedal in perspective; Fig. 6 is a detail of a supporting member in perspective; Fig. 6a is a detail of the flywheel casing carried thereby in perspective; Fig. 7 is an assembly view of the clutches and hand lever therefor in perspective; Fig. 8 is a casing detail in perspective; Fig. 9 is a detail of the rear end gear housing in perspective; Fig. 10 is a detail of the rear end in perspective; Fig. 11 is an assembly view of the entire device in perspective; and Fig. 12 is another assembly detail in perspective.

The arrangement for reversing the motion consists of a driving shaft 1 and an intermediate shaft 6 on which is secured a flywheel 2 with internal teeth and a lay-shaft of two parts 3, 3' parallel to the driving shaft. Said intermediate shaft is terminated at its rear end by a socket 4 in which is pivoted a ball 5 integral with a shaft 6' which prolongs shaft 6. The shaft 6' carries at its opposite end a bevel pinion 7 which serves to transmit the movement of the driving shaft to the axle of the rear wheels. The ball and socket 4, 5 serve to absorb vibrations.

The driving shaft 1 is provided with a clutch consisting of a fixed crown toothed sleeve 11a and a sliding crown toothed sleeve 11b, and shaft 3, 3' is provided with a similar clutch 12 consisting of crown toothed members 12a and 12b. The two sliding parts 11b, 12b of the clutches 11 and 12 are held in the stationary position by coiled springs 13 and 14 surrounding their respective shafts 1 and 3. These springs are connected by one of their ends to circular grooved collars 15 and 16 integral with the sliding sleeves 11b and 12a in such a manner as to work under tension.

A plate 17 (Fig. 2) preferably mounted on ball races and having a finger piece 18 in which is formed a mortice, engages freely the two collars 15 and 16.

The engagement of the clutches is effected by means of an operating lever 19 the handle of which is within reach of the driver. This lever is articulated at its lower end in a stirrup piece 20 secured to the base of a cup-member 21 (Figs. 7 and 8) which is riveted to the chassis.

The lever 19 passes through the mortice of the finger piece 18 which is integral with the plate 17 and it is guided in its angular displacements between two parallel bars 22. When it is pushed to the front end in the position corresponding to forward travel the lever engages between two balls 23 (Fig. 3) which are retained in two hemi-spherical washers 24 upon which press coiled springs 25 whose tension is regulated from outside by means of screw-threaded plugs 26 which screw onto screw-threaded ends of tubular bearings 26' in which the springs 25 are lodged.

The lever 19 has a nose piece 19' and when it is brought to the rear into the position corresponding to the reverse movement, its nose 19' comes opposite a pivoted pawl 27. Said pawl is mounted on a pedal 28 and is subjected to the action of a spring 29 which tends to hold the pawl in a lowered position with the pedal raised.

In this position the nose 19' of the lever is not held by the pawl 27. By pressing upon the pedal 28 the pawl oscillates on its pivot compressing the spring 29 and engages beneath the nose piece 19' in locking position for reverse running which is ensured by the clutch 12 of the lay shaft 3, 3'. The pinion 10 fast on shaft 3' and meshing with the flywheel 2 reduces the speed of the reverse motion.

The movement of the driving shaft 1 is transmitted to the rear axle 30 (Fig. 10) by the bevel pinion 7 fast on the end of the shaft 6' and which engages with a wheel 31 with corresponding teeth, fast on said shaft. Wheel 31 is enclosed and turns freely in ball bearings in a casing 32 (Fig. 9).

It will be understood from what has been described above that when the lever 19 is pushed into its extreme forward position between the two balls 23, the plate 17 causes the engagement of the sleeves 11a, 11b thus connecting the shafts 1 and 6 as well as the bevel pinion 7 driving the toothed wheel 31 and the rear axle 30 in the forward direction.

If, on the contrary, the lever 19 is brought into its extreme rear position, the plate 17 declutches the sleeves 11a, 11b and engages the sleeves 12a, 12b of the lay-shaft 3, 3' which receives in this case its rotation from the driving shaft 1 through the toothed wheel 8, this movement being transmitted to it in the reverse direction by toothed wheel 9 which is, in turn, re-transmitted through pinion 10 to the flywheel 2.

Flywheel 2 being rigid with shaft 6 likewise turns in reverse direction corresponding to reverse running, at reduced speed.

This reversal of movement can be effected rapidly and very smoothly by reason of the disposition of the clutching and declutching mechanisms of one or other of the sleeves and of the operating lever 19.

The driving shaft 1 and lay-shaft 3 are mounted in thrust bearings 33 (Fig. 11) suitably disposed on the cross members 34, 35 which connect the two longitudinal members of the chassis frame. The rear cross member 35 has a recess 36 for the passage of the flywheel 2 which is enclosed in the casing 37 (Fig. 6) secured below the cross member 35.

Finally reinforcing bars 38 are secured in brackets 39 and housings 40 formed on the casing 32.

Said bars consist of two parts resiliently connected together by means of coiled springs held in place by screws.

The steering wheel 41, the lever 19 and the pedal 28 are arranged in the usual manner near the seat 42 (Fig. 12) of the driver.

While I have disclosed what I deem to be the preferable form of my device I do not wish to be limited thereto as there might be various changes made in the details of construction and the arrangement of parts without departing from the spirit of the invention comprehended with the scope of the appended claims.

I claim:

1. In a motion reversing device for motor vehicles, the combination of a drive shaft, a driven shaft, a fixed crown toothed sleeve on said drive shaft, a slidably mounted crown toothed sleeve on said drive shaft co-operating with said first mentioned sleeve, spring means tending to separate said movable sleeve from said fixed sleeve, a two-part lay shaft, a fixed crown toothed sleeve on one of said lay shaft parts, a slidably mounted crown toothed sleeve on the other of said lay shaft parts disposed along side the slidable sleeve on said drive shaft, a second spring means tending to separate the movable sleeve from the fixed sleeve on the lay shaft parts, a toothed flywheel on said driven shaft, a pinion on the part of said lay shaft carrying a fixed sleeve meshing with said flywheel, a pinion on the other part of said lay shaft, a pinion on said driving shaft meshing with said last named pinion, a grooved collar on each of said slidably mounted sleeves, a plate connecting said collars together and a manually controlled lever for displacing said plate.

2. In a motion reversing device for motor vehicles, the combination of a drive shaft, a driven shaft, a fixed crown toothed sleeve on said drive shaft, a slidably mounted crown toothed sleeve on said driven shaft co-operating with said first mentioned sleeve, spring means tending to separate said movable sleeve from said fixed sleeve, a two part lay shaft, a fixed crown toothed sleeve on one of said lay shaft parts, a slidably mounted crown toothed sleeve on the other of said lay shaft parts disposed along side the slidable sleeve on said drive shaft, a second spring means tending to separate the movable sleeve from the fixed sleeve on said lay shaft parts, a toothed flywheel on said driven shaft, a pinion on the part of said lay shaft carrying a fixed sleeve meshing with said flywheel, a pinion on the other part of said lay shaft, a pinion on said driving shaft meshing with said last named pinion, a grooved collar on each of said slidably mounted sleeves, a plate connecting said collars together, a manually controlled lever for displacing said plate, a foot controlled latch for locking said lever in one extreme position and automatically releasable means for locking said lever in the other extreme position.

3. In a motion reversing device for motor vehicles, the combination, of a drive shaft, a driven shaft, a fixed crown toothed sleeve on said drive shaft, a slidably mounted crown toothed sleeve on said driven shaft co-operating with said first-mentioned sleeve, spring means tending to separate said movableسleeve from said fixed sleeve, a two part lay shaft, a fixed crown toothed sleeve on one of said lay shaft parts, a slidably mounted crown toothed sleeve on the other of said lay shaft parts disposed along side the slidable sleeve on said drive shaft, a second spring means tending to separate the movable sleeve from the fixed sleeve on said lay shaft parts, a toothed flywheel on said driven shaft, a pinion on the part of said lay shaft carrying a fixed sleeve meshing with said flywheel, a pinion on the other part of said lay shaft, a pinion on said driving shaft meshing with said last named pinion, a grooved collar on each of said slidably mounted sleeves, a plate connecting said collars together, a manually controlled lever for displacing said plate, a foot-controlled latch for locking said lever in one extreme position and a pair of spring-pressed balls adapted to releasably retain said lever in the other extreme position.

4. In a motion reversing device for motor vehicles, the combination, of a drive shaft, a driven shaft, a spring-pressed clutch interconnecting said drive shaft and said driven shaft, a two-part lay shaft, a spring-pressed clutch interconnecting the parts of said lay shaft, a toothed flywheel on said driven shaft, a pinion on one of the parts of said lay shaft meshing with said flywheel, a pinion on the other part of said lay shaft, a pinion on said driving shaft meshing with said last named pinion, and manually controlled means for displacing said clutches together in the same direction and means for disengaging said clutches when moved in the opposite direction.

JEAN BAPTISTE REIGNERON.